(12) United States Patent
Kim et al.

(10) Patent No.: US 10,590,217 B2
(45) Date of Patent: Mar. 17, 2020

(54) CURABLE RESIN COMPOSITION, METHOD FOR CURING SAME, AND SHEET MANUFACTURED THEREFROM

(71) Applicant: LG Hausys, Ltd., Seoul (KR)

(72) Inventors: Dong Kwan Kim, Ulsan (KR); Min Hee Lee, Gunpo-si (KR)

(73) Assignee: LG HAUSYS, LTD., Seoul (KR)

( * ) Notice: Subject to any disclaimer, the term of this patent is extended or adjusted under 35 U.S.C. 154(b) by 714 days.

(21) Appl. No.: 14/415,030

(22) PCT Filed: Dec. 27, 2012

(86) PCT No.: PCT/KR2012/011615
§ 371 (c)(1),
(2) Date: Jan. 15, 2015

(87) PCT Pub. No.: WO2014/021521
PCT Pub. Date: Feb. 6, 2014

(65) Prior Publication Data
US 2015/0183909 A1  Jul. 2, 2015

(30) Foreign Application Priority Data
Jul. 30, 2012  (KR) .................. 10-2012-0083539

(51) Int. Cl.
*C08F 220/18* (2006.01)
*C08F 20/10* (2006.01)
(Continued)

(52) U.S. Cl.
CPC .............. *C08F 220/18* (2013.01); *B29D 7/00* (2013.01); *B29D 7/01* (2013.01); *C08F 2/48* (2013.01);
(Continued)

(58) Field of Classification Search
CPC ..................................................... C08F 220/18
(Continued)

(56) References Cited

U.S. PATENT DOCUMENTS 4,284,762 A * 8/1981 Miyata ...................... C08K 3/24
524/451
6,203,911 B1 * 3/2001 Weberg ..................... C08F 4/38
428/413
(Continued)

FOREIGN PATENT DOCUMENTS

| CN | 101016347 A | 8/2007 |
| CN | 101370836 A | 2/2009 |

(Continued)

OTHER PUBLICATIONS

International Search Report for PCT/KR2012/011615 dated Apr. 25, 2013.

(Continued)

*Primary Examiner* — Tahseen Khan
(74) *Attorney, Agent, or Firm* — Hauptman Ham, LLP

(57) ABSTRACT

Provided are a curable compound, a photoinitiator, and a curable resin composition comprising at least two types of thermal initiators, each having different initiation reaction temperature. Since the curable resin composition can improve a curing rate while having a high conversion rate, the curable resin composition is suitable for manufacturing thick films.

5 Claims, 2 Drawing Sheets

(51) Int. Cl.

| | | |
|---|---|---|
| *C09D 133/04* | (2006.01) | |
| *C09D 4/00* | (2006.01) | |
| *C08F 220/06* | (2006.01) | |
| *B29D 7/01* | (2006.01) | |
| *C08F 2/48* | (2006.01) | |
| *B29D 7/00* | (2006.01) | |
| *C08F 220/10* | (2006.01) | |

(52) U.S. Cl.
CPC ............ *C08F 20/10* (2013.01); *C08F 220/06* (2013.01); *C09D 4/00* (2013.01); *C09D 133/04* (2013.01); *C08F 220/10* (2013.01); *C08L 2312/06* (2013.01)

(58) Field of Classification Search
USPC ....................................................... 428/220
See application file for complete search history.

(56) References Cited

U.S. PATENT DOCUMENTS

| 6,383,530 | B1* | 5/2002 | Iwashita | ................ | A21D 6/001 |
| | | | | | 426/128 |
| 6,479,579 | B1* | 11/2002 | Tanimura | ................ | C08L 23/02 |
| | | | | | 524/523 |
| 2007/0079825 | A1* | 4/2007 | Sera | ....................... | C09K 5/063 |
| | | | | | 126/620 |
| 2010/0167045 | A1 | 7/2010 | Schultes et al. | | |
| 2012/0121881 | A1* | 5/2012 | Kim | ...................... | B29C 39/18 |
| | | | | | 428/220 |

FOREIGN PATENT DOCUMENTS

| CN | 102321424 | A | | 1/2012 |
| CN | 102471508 | A | | 5/2012 |
| JP | 4-220485 | A | | 8/1992 |
| JP | 7-324104 | A | | 12/1995 |
| JP | 11-258552 | A | | 9/1999 |
| JP | 2000-7718 | A | | 1/2000 |
| JP | 2010189485 | A | | 9/2010 |
| KR | 1020060020098 | A | | 3/2006 |
| KR | 100934342 | B1 | | 12/2009 |
| KR | 20090132548 | A | | 12/2009 |
| KR | 20110011197 | A | | 2/2011 |
| KR | 20120009507 | A | | 1/2012 |
| TW | 201107383 | A | | 3/2011 |
| WO | 8905310 | A2 | | 6/1989 |
| WO | 9716469 | A1 | | 5/1997 |
| WO | WO2011025169 | A2 | * | 3/2011 |

OTHER PUBLICATIONS

Chinese Office Action dated Dec. 25, 2015 in connection with the counterpart Chinese Patent Application No. 201280075066.6.
European Search Report dated Jun. 6, 2015 in connection with the counterpart European Patent Application No. 12882190.7.
Taiwanese Office Action dated Jul. 31, 2015.
Japanese Office Action dated Sep. 16, 2016 for Japanese Patent Application No. 2015-525313.

* cited by examiner

CURABLE RESIN COMPOSITION, METHOD FOR CURING SAME, AND SHEET MANUFACTURED THEREFROM

CROSS REFERENCE TO RELATED APPLICATION

This application claims the priority of Korean Patent Application No. 10-2012-0083539 filed on Jul. 30, 2012 in the Korean Patent and Trademark Office. Further, this application is the National Phase application of International Application No. PCT/KR2012/011615 filed on Dec. 27, 2012, which is incorporated herein by reference in its entirety.

TECHNICAL FIELD

The present invention relates to a curable resin composition, a method for curing the same, and a sheet manufactured therefrom.

BACKGROUND ART

A curable resin composition is manufactured into a sheet by curing. When the sheet is manufactured as a thick film, curing time is extremely increased. This is because in curing of a thick film, it takes a lot of time to form a polymer network in an initial stage and reaction rate is gradually decreased over time irrespective of increase in curing rate after a certain period of curing time.

DISCLOSURE

Technical Problem

It is one aspect of the present invention to provide a curable resin composition capable of exhibiting an improved curing rate while exhibiting a high conversion rate.

It is another aspect of the present invention to provide a sheet using the curable resin composition as set forth above.

It is a further aspect of the present invention to provide a method for curing the curable resin composition as set forth above.

Technical Solution

In accordance with one aspect of the present invention, a curable resin composition includes a curable compound, a photoinitiator, and at least two types of thermal initiators, each having different initiation temperature.

A cured product of the curable resin composition may exhibit a molecular weight distribution having at least two peaks.

The cured product of the curable resin composition may have at least two glass transition temperatures.

The thermal initiators may include a first thermal initiator and a second thermal initiator, and the second thermal initiator may start curing at a higher temperature than the first thermal initiator.

The first thermal initiator may start curing at about 30° C. to about 70° C.

The second thermal initiator may start curing at about 60° C. to about 100° C.

The curable compound may be an acrylic compound.

The curable resin composition may further include a polyfunctional acrylate crosslinking agent.

The curable resin composition may further include at least one additive selected from the group consisting of thermal conductive additives, flame retardants, pigments, antioxidants, UV stabilizers, dispersants, defoamers, thickeners, plasticizers, adhesion-imparting resins, silane coupling agents, and combinations thereof.

In accordance with another aspect of the present invention, a sheet includes a cured product layer of the above curable resin composition.

The cured product layer may have a first peak at a number average molecular weight of about $10^4$ to about $10^5$, and a second peak at a number average molecular weight of greater than about $10^5$ to about $10^6$.

The cured product layer may have a first glass transition temperature of about 45° C. to about 85° C., and a second glass transition temperature of about 100° C. to about 130° C.

The cured product layer may have a first glass transition temperature of about 45° C. to about 60° C., a second glass transition temperature of about 65° C. to about 85° C., and a third glass transition temperature of about 100° C. to about 130° C.

The sheet may include: a base film; and the cured product layer formed on one or both surfaces of the base film.

The cured product layer may have a thickness of about 3.0 mm to about 10.0 mm.

The cured product layer may be a layer formed of a cured product obtained by sequentially performing first thermal curing, photocuring through light irradiation, and second thermal curing with respect to the curable resin composition.

In accordance with a further aspect of the present invention, a curing method includes: performing first thermal curing of a curable resin composition including a curable compound, a photoinitiator, and at least two types of thermal initiators, each having different initiation temperature; performing photocuring of the thermally cured product through light irradiation; and performing second thermal curing by heating the photocured product.

First thermal curing, photocuring, and second thermal curing may be sequentially performed.

First thermal curing may be performed at about 30° C. to about 70° C.; second thermal curing may be performed at about 60° C. to about 100° C.; and second thermal curing may be performed at a higher temperature than first thermal curing.

Photocuring may be performed by UV irradiation.

Advantageous Effects

Since the curable resin composition can exhibit an improved curing rate while exhibiting a high conversion rate, the curable resin composition is suitable for manufacture of thick films.

BEST MODE

Figure 1:
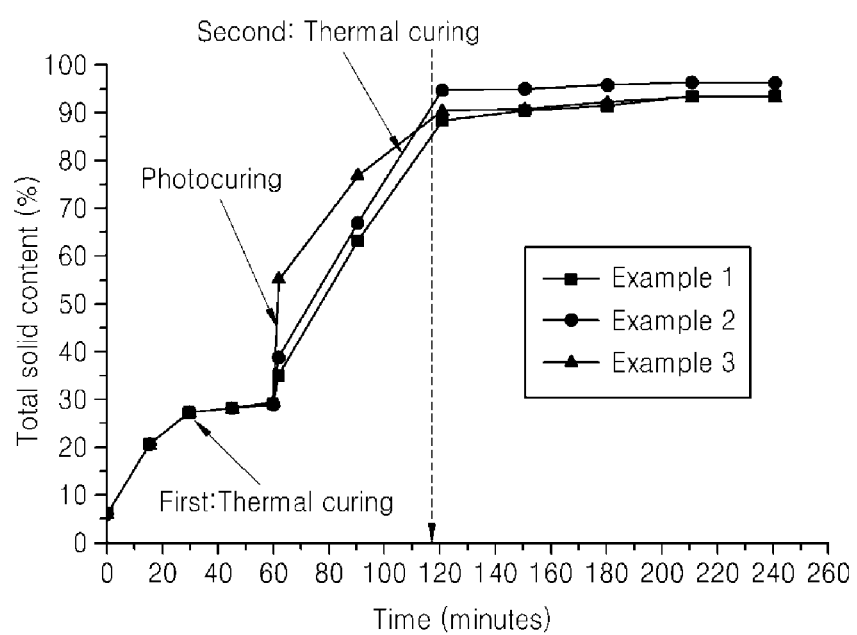
FIG. 1 is a graph depicting solid content with respect to curing time, as measured on curable resin compositions prepared in Examples 1 to 3.

Hereinafter, embodiments of the present invention will be described in detail. However, it should be understood that the present invention is not limited to the following embodiments. The scope of the invention should be defined only by the accompanying claims and equivalents thereof.

In accordance with one aspect of the present invention, a curable resin composition includes a curable compound, a photoinitiator, and at least two types of thermal initiators, each having different initiation temperature.

The curable compound may include monomers, oligomers and prepolymers for formation of curable resins, and combinations thereof.

The curable resin composition may be cured by photocuring and at least two stages of thermal curing. Thermal curing is performed at different temperatures using at least two types of thermal initiators which start thermal curing at different temperatures, respectively. That is, the curable resin composition may be subjected to independent thermal curing at least twice by different thermal initiators.

As such, since the curable resin composition is cured by both thermal curing and photocuring, a cured product thereof exhibits a molecular weight distribution with at least two peaks. One of the peaks corresponds to a resin formed by photocuring and at least one of the remaining peaks corresponds to a resin formed by thermal curing. Since the resins formed at respective stages of thermal curing can have a similar molecular weight distribution even though the cured product is formed by at least two stages of thermal curing, one merged peak can be formed instead of separate peaks in the molecular weight distribution. However, depending upon thermal initiators used, since resins having molecular weights distinguished by the respective stages of thermal curing performed at different initiation temperatures can be formed, the cured product of the curable resin composition can also exhibit a molecular weight distribution having at least three peaks.

In addition, since the curable resin composition is cured by both thermal curing and photocuring, the cured product thereof has at least two glass transition temperatures. One of the at least two glass transition temperatures corresponds to the resin formed by photocuring, and at least one of the remaining glass transition temperatures corresponds to the resin formed by thermal curing. Since the resins formed at respective stages of thermal curing can have similar properties and structures even though the cured product is formed by at least two stages of thermal curing, the cured product can have adjoining or similar glass transition temperatures instead of different glass transition temperatures. However, depending upon thermal initiators used, since resins having properties and structures distinguished by the respective stages of thermal curing performed at different initiation temperatures can be formed, the cured product of the curable resin composition can also have at least three glass transition temperatures.

Since the curable resin composition is cured through at least three stages of curing including photocuring and at least two stages of thermal curing, curing productivity can be improved due to an improved curing rate. Although the curing rate is decreased during a first stage of curing over time, if the at least three stages of curing are sequentially performed as described above, the curing rate is not decreased, thereby achieving a high conversion rate in a short period of time.

As such, since the curable resin composition, which can be subjected to at least three stages of curing as described above, can exhibit an improved curing rate and achieve a high conversion rate in a short period of time, the curable resin composition is extremely suitable for use in thick film processes requiring a long curing time. For example, the curable resin composition is cured so as to have a high conversion rate in a short curing time, thereby manufacturing a thick sheet having a thickness of about 3.0 mm to about 10.0 mm Specifically, the curable resin composition may be manufactured into a thick sheet having a thickness of about 3.0 mm to about 5.0 mm by curing.

In one embodiment, the thermal initiators may be two types of thermal initiators including a first thermal initiator, which starts curing at about 30° C. to about 70° C., specifically about 40° C. to about 60° C., and a second thermal initiator, which starts curing at a higher temperature than the first thermal initiator. The second thermal initiator may be, for example, a thermal initiator reacting at about 60° C. to about 100° C., specifically about 70° C. to about 90° C.

In another embodiment, the curable resin composition may be cured by sequentially performing first thermal curing, photocuring through light irradiation, and second thermal curing. Second thermal curing may be activated by heat generated through decomposition of the photoinitiator due to irradiation with, for example, UV light or the like or by additional heating, and thus is performed independent of photocuring.

The photoinitiator can initiate curing of an adhesive composition in response to irradiation using UV or the like in the manufacture of adhesive sheets.

Examples of the photoinitiator may include: α-hydroxyketone compounds (for example, IRGACURE 184, IRGACURE 500, IRGACURE 2959, DAROCUR 1173; Ciba Specialty Chemicals Co., Ltd.); phenylglyoxylate compounds (for example, IRGACURE 754, DAROCUR MBF; Ciba Specialty Chemicals Co., Ltd.); benzyl dimethyl ketal compounds (for example, IRGACURE 651; Ciba Specialty Chemicals Co., Ltd.); α-aminoketone compounds (for example, IRGACURE 369, IRGACURE 907, IRGACURE 1300; Ciba Specialty Chemicals Co., Ltd.); monoacyl phosphine compounds (MAPO) (for example, DAROCUR TPO; Ciba Specialty Chemicals Co., Ltd.); bisacyl phosphine compounds (BAPO) (for example, IRGACURE 819, IRGACURE 819DW; Ciba Specialty Chemicals Co., Ltd.); phosphine oxide compounds (for example, IRGACURE 2100; Ciba Specialty Chemicals Co., Ltd.); metallocene compounds (for example, IRGACURE 784; Ciba Specialty Chemicals Co., Ltd.); iodonium salts (for example, IRGACURE 250; Ciba Specialty Chemicals Co., Ltd.); and mixtures thereof (for example, DAROCUR 4265, IRGACURE 2022, IRGACURE 1300, IRGACURE 2005, IRGACURE 2010, IRGACURE 2020; Ciba Specialty Chemicals Co., Ltd.), without being limited thereto.

The photoinitiator can adjust a degree of polymerization of an adhesive depending upon the amount thereof in use. For example, the photoinitiator may be present in an amount of about 0.01 parts by weight to about 10 parts by weight, specifically about 0.1 parts by weight to about 5 parts by weight, more specifically about 0.1 parts by weight to about 3 parts by weight, still more specifically about 0.1 parts by weight to about 1.5 parts by weight, based on 100 parts by weight of the curable compound. Within this range, curing of the curable resin composition can be facilitated, and residues after curing can be reduced.

Examples of the thermal initiators may include: azo compounds such as 2,2'-azobis(2-methylbutyronitrile), 2,2'-azobis(isobutyronitrile), 2,2'-azobis(2,4-dimethylvaleronitrile), 4,4-azobis(4-cyanovaleric acid), 1,1'-azobis(cyclohexanecarbonitrile), 2,2'-azobis(4-methoxy-2,4-dimethylvaleronitrile), and the like; peroxy compounds such as tetramethylbutyl peroxyneodecanoate (for example, Perocta ND, NOF Co., Ltd.), bis(4-butylcyclohexyl)peroxydicarbonate (for example, Peroyl TCP, NOF Co., Ltd.), di(2-ethylhexyl)peroxycarbonate, butyl peroxyneodecanoate (for example, Perbutyl ND, NOF Co., Ltd.), dipropyl peroxydicarbonate (for example, Peroyl NPP, NOF Co., Ltd.), diisopropyl peroxydicarbonate (for example, Peroyl IPP, NOF Co., Ltd.), diethoxyethyl peroxydicarbonate (for example, Peroyl EEP, NOF Co., Ltd.), diethoxyhexyl peroxydicarbonate (for example, Peroyl OEP, NOF Co., Ltd.), hexyl peroxydicarbonate (for example, Perhexyl ND, NOF Co., Ltd.), dimethoxybutyl peroxydicarbonate (for example, Peroyl MBP, NOF Co., Ltd.), bis(3-methoxy-3-methoxybutyl)peroxydicarbonate (for example, Peroyl SOP, NOF Co., Ltd.), dibutyl peroxydicarbonate, dicetyl peroxydicarbonate, dimyristyl peroxydicarbonate, 1,1,3,3-tetramethylbutyl peroxypivalate, hexyl peroxypivalate (for example, Perhexyl PV, NOF Co., Ltd.), butyl peroxypivalate (for example, Perbutyl, NOF Co., Ltd.), trimethylhexanoyl peroxide (for example, Peroyl 355, NOF Co., Ltd.), dimethyl hydroxybutyl peroxyneodecanoate (for example, Luperox 610M75, Atofina Co., Ltd.), amyl peroxyneodecanoate (for example, Luperox 546M75, Atofina Co., Ltd.), butyl peroxyneodecanoate (for example, Luperox 10M75, Atofina Co., Ltd.), t-butyl peroxyneoheptanoate, amyl peroxypivalate (for example, Luperox 546M75, Alofina Co., Ltd.), t-butyl peroxypivalate, t-amyl peroxy-2-ethylhexanoate, lauroyl peroxide, dilauroyl peroxide, didecanoyl peroxide, benzoyl peroxide, dibenzoyl peroxide, 2,2-bis(tert-butylperoxy)butane, 1,1-bis(tert-butylperoxy)cyclohexane, 2,5-bis(butylperoxy)-2,5-dimethylhexane, 2,5-bis(tert-butylperoxy)-1-methylethyl)benzene, 1,1-bis(tert-butylperoxy)-3,3,5-trimethylcyclohexane, tert-butyl hydroperoxide, tert-butyl peroxide, tert-butyl peroxybenzoate, tert-butylperoxy isopropyl carbonate, cumene hydroxyperoxide, dicumyl peroxide, lauroyl peroxide, 2,4-pentanediene peroxide, and the like; tert-butyl peracetate; peracetic acid; and potassium persulfate, without being limited thereto. These thermal initiators may be used alone or in combination thereof.

The thermal initiators can adjust a degree of polymerization of an adhesive depending upon an amount thereof in use. For example, the thermal initiators may be present in an amount of about 0.01 parts by weight to about 10 parts by weight, specifically about 0.1 parts by weight to about 5 parts by weight, more specifically about 0.1 parts by weight to about 3 parts by weight, still more specifically about 0.1 parts by weight to about 1.5 parts by weight, based on 100 parts by weight of the curable compound. Within this range, curing of the curable resin composition can be facilitated, and residues after curing can be reduced.

In the curable resin composition, a weight ratio of the thermal initiators to the photoinitiator (thermal initiators/photoinitiator) may range from about 0.5 to about 10, specifically from about 0.5 to about 5, more specifically from about 0.5 to about 3. Within this range, a sheet can secure excellent properties and productivity while manufactured to a thicker thickness through curing, as described below.

The curable compound may be any compound known in the art without limitation. For example, the curable compound may be an acrylic compound.

The acrylic compound may be any acrylic compound without limitation. Specifically, the acrylic compound may include a $C_1$ to $C_{12}$ alkyl group-containing (meth)acrylic acid ester compound. More specifically, the (meth)acrylic acid ester compound may include methyl(meth)acrylate, ethyl (meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl (meth)acrylate, isooctyl(meth)acrylate, isononyl(meth) acrylate, lauryl(meth)acrylate, tetradecyl(meth)acrylate, and combinations thereof.

In one embodiment, the curable compound may include an acrylic copolymer including: 100 parts by weight of a (meth)acrylic acid ester compound; and 1 part by weight to 20 parts by weight of a cross-linkable functional group-containing monomer.

The cross-linkable functional group-containing monomer included in the acrylic copolymer may serve to adjust durability and cohesion of the cured product, for example, by providing a cross-linkable functional group capable of reacting with a polyfunctional crosslinking agent or the like to the copolymer.

Here, examples of the cross-linkable functional group-containing monomer capable of being used may include hydroxyl group-containing monomers, carboxyl group-containing monomers, and nitrogen-containing monomers, without being limited thereto. Examples of the hydroxyl group-containing monomers may include 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth) acrylate, and 2-hydroxypropyleneglycol(meth)acrylate, without being limited thereto. Examples of the carboxyl group-containing monomers may include (meth)acrylic acid, 2-(meth)acryloyloxy acetic acid, 3-(meth)acryloyloxy propionic acid, 4-(meth)acryloyloxy butyric acid, acrylic acid dimers, itaconic acid, maleic acid, and maleic anhydride, without being limited thereto. Examples of the nitrogen-containing monomers may include (meth)acrylamide, N-vinylpyrrolidone, and N-vinylcaprolactam, without being limited thereto. These monomers may be used alone or in combination thereof.

The cross-linkable functional group-containing monomer may be present in an amount of about 1 part by weight to about 20 parts by weight in the aforementioned copolymer, based on 100 parts by weight of the (meth)acrylic acid ester compound. Within this range, the curable resin composition can maintain balance between excellent durability, adhesion and/or peel strength.

In addition, the curable resin composition may further include about 0.05 parts by weight to about 5 parts by weight of a crosslinking agent based on 100 parts by weight of the curable compound, in terms of improvement in cohesion. The curable resin composition further includes an appropriate crosslinking agent, thereby adjusting adhesive properties.

The crosslinking agent may be any crosslinking agent without limitation so long as the crosslinking agent can be involved in curing by UV irradiation and heat. For example, the crosslinking agent may be a polyfunctional acrylate. Examples of the polyfunctional acrylate may include: bifunctional acrylates such as 1,2-ethylene glycol diacrylate, 1,12-dodecanediol acrylate, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth) acrylate, caprolactone-modified dicyclopentenyl di(meth) acrylate, ethylene oxide-modified di(meth)acrylate, di(meth)acryloxyethyl isocyanurate, allylated cyclohexyl di(meth) acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, 9,9-bis[4-(2-acryloyloxyethoxy)phenyl]fluorene, and the like; trifunctional acrylates such as trimethylolpropane tri(meth)acrylate, dipentaerythritol tri(meth)acrylate, propionic acid-modified dipentaerythritol tri(meth) acrylate, pentaerythritol tri(meth)acrylate, propylene oxide-modified trimethylolpropane tri(meth)acrylate, trifunctional urethane(meth)acrylate, tris(meth)acryloxyethyl isocyanurate, and the like; tetrafunctional acrylates such as diglycerin tetra(meth)acrylate, pentaerythritol tetra(meth)acrylate, and the like; pentafunctional acrylates such as propionic acid-modified dipentaerythritol penta(meth)acrylate, and the like; and hexafunctional acrylates such as dipentaerythritol hexa (meth)acrylate, caprolactone-modified dipentaerythritol hexa(meth)acrylate, urethane(meth)acrylate (for example, reaction products of isocyanate monomers and trimethylolpropane tri(meth)acrylate), without being limited thereto.

The crosslinking agent may be present in an amount of about 0.05 parts by weight to about 5 parts by weight, based on 100 parts by weight of the curable compound. Within this range, the curable resin composition can maintain balance between excellent durability and cohesion.

The curable resin composition may appropriately include at least one additive selected from the group consisting of thermal conductive additives, flame retardants, pigments, antioxidants, UV stabilizers, dispersants, defoamers, thickeners, plasticizers, adhesion-imparting resins, silane coupling agents, and combinations thereof.

In accordance with another aspect of the present invention, a curing method includes: performing first thermal curing of a curable resin composition including a curable compound, a photoinitiator, and at least two types of thermal initiators, each having different initiation temperature; performing photocuring of the thermally cured product through light irradiation; and performing second thermal curing by heating the photocured product.

First thermal curing may be performed at about 30° C. to about 70° C., specifically about 40° C. to about 60° C.; and second thermal curing may be performed at about 60° C. to about 100° C., specifically about 70° C. to about 90° C. Second thermal curing may be performed at a higher temperature than first thermal curing.

In the curing method, first thermal curing, photocuring, and second thermal curing may be sequentially performed, as described above.

First thermal curing may be performed, for example, for about 30 minutes to about 60 minutes.

Photocuring may be performed by irradiation with UV light or the like. First thermal curing may be performed for about 30 minutes to about 60 minutes, followed by transitioning to photocuring through light irradiation. Photocuring may be performed, for example, for about 0.5 minutes to about 5 minutes.

Photocuring may be performed by any method without limitation. For example, photocuring may be performed by UV irradiation of a curing object (the curable resin composition) using a device such as a high-pressure mercury lamp, an electrodeless lamp, a xenon lamp, and the like. Here, UV irradiation may be performed at any intensity without limitation so long as the intensity is controlled such that the cured product is sufficiently cured without damage to properties thereof.

Second thermal curing may be performed by heating the photocured composition to an initiation temperature for thermal curing. Specifically, photocuring is performed for about 0.5 minutes to about 5 minutes, followed by heating to an initiation temperature for curing the thermal initiator in order to perform second thermal curing, thereby transitioning to second thermal curing. Second thermal curing may be performed, for example, for about 30 minutes to about 120 minutes.

Although photocuring is induced due to the photoinitiator in the curing object (the curable resin composition, or the curable resin composition subjected to first thermal curing) if curing is performed through UV irradiation, as described above, since heat generated through photocuring can be insufficient to induce second thermal curing, second thermal curing polymerization due to the thermal initiator may be initiated through separate heating, thereby performing three stages of curing step by step. After UV irradiation, separate heating may be performed by hot air, infrared heating, and the like.

In accordance with a further aspect of the present invention, a sheet includes a cured product layer containing a cured product of the curable resin composition as set forth above.

Since the sheet includes the cured product layer formed as a cured product using the curable resin composition, the sheet can include a thick single cured product layer, which maintains uniform surface and internal properties and is formed by a simple process.

The cured product layer is a layer formed by curing the aforementioned curable resin composition through independent and sequential first thermal curing-photocuring-second thermal curing, and may exhibit a molecular weight distribution having at least two peaks.

For example, the cured product layer may have one peak at a number average molecular weight of about $10^4$ to about $10^5$, and another peak at a number average molecular weight of greater than about $10^5$ to about $10^6$.

In addition, the cured product layer is a layer formed by curing the aforementioned curable resin composition through independent and sequential first thermal curing-photocuring-second thermal curing, and may have at least two glass transition temperatures.

In one embodiment, the cured product layer may be a layer formed of a cured product obtained by sequentially performing first thermal curing, photocuring through light irradiation, and second thermal curing with respect to the curable resin composition.

In one example, the cured product layer may have one glass transition temperature of about 45° C. to about 85° C., and another glass transition temperature of about 100° C. to about 130° C.

In another example, the cured product layer may have a first glass transition temperature of about 50° C. to about 70° C., and a second glass transition temperature of about 100° C. to about 130° C.

In a further example, the cured product layer may have a first glass transition temperature of about 45° C. to about 60° C., a second glass transition temperature of about 65° C. to about 85° C., and a third glass transition temperature of about 100° C. to about 130° C.

In one embodiment, the sheet may include: a base film; and a cured product layer, which is formed on one or both surfaces of the base film and contains a cured product of the curable resin composition.

The base film included in the sheet may be any typical film known in the art. Specifically, the base film may include various plastic films, paper, nonwoven fabrics, glass, and metal. In one embodiment, the base film may be a plastic film such as polyethylene terephthalate (PET).

There is an advantage in that a thick film maintaining uniform internal and surface properties can be manufactured by curing the curable resin composition using the method as described above. For example, the cured product layer may have a thickness of about 3 mm or more, specifically about 4.0 mm or more, more specifically about 5.0 mm or more. In addition, for example, the cured product layer may have an upper limit thickness of about 10 mm or less, about 9 mm or less, or about 8 mm or less, without being limited thereto. Within this range, the cured product layer does not require an excess of energy due to excellent curing efficiency and thus can suppress damage to a surface thereof.

The sheet may be manufactured using any typical method. For example, the curable resin composition including the aforementioned components is coated onto the base film, followed by performing at least three separate stages of curing as described above, thereby forming the cured product layer. Alternatively, an adhesive layer is formed on an appropriate release film, followed by transferring the adhesive layer to the base film, thereby manufacturing an adhesive sheet. Details of the three stages of curing are the same as described above.

Here, a coating liquid may also be prepared from the curable resin composition including the aforementioned components using any typical method. For example, monomers (for example, a (meth)acrylic acid ester monomer and a cross-linkable functional group-containing monomer) included in a copolymer forming a curable resin are subjected to partial polymerization, preferably partial polymerization by heat, and additives including a thermal initiator and a photoinitiator are added to the resulting material, which in turn is adjusted to an appropriate viscosity (for example, from 100 cPs to 10,000 cPs), thereby preparing the coating liquid.

In addition, the prepared coating liquid is coated onto the base film or release paper, followed by performing first thermal curing-photocuring-second thermal curing as in the aforementioned method.

The sheet may be used to form a surface of electronics.

For example, the sheet can be formed as a sheet including desired recesses and protrusions thereon or as a patterned sheet using a cast mold.

Hereinafter, the present invention will be described in more detail with reference to some examples. It should be understood that these examples are provided for illustration only and are not to be construed in any way as limiting the present invention.

EXAMPLES

Example 1

100 parts by weight of a polymerizable compound was prepared by partial polymerization of 95 parts by weight of 2-ethylhexyl acrylate and 5 parts by weight of acrylic acid, followed by mixing with 0.2 parts by weight of ethylhexyl peroxydicarbonate (PX 47, initiation temperature: 47° C.) as a first thermal initiator, 0.1 parts by weight of 1-hydroxychlorohexane acetophenone (lig 184) as a photoinitiator, and 0.2 parts by weight of t-butyl peroxypivalate (PX 75, Segi Academy Co., Ltd., initiation temperature: 75° C.) as a second thermal initiator, thereby preparing a curable resin composition. The curable resin composition was injected between glass plates having a gap of 3.5 mm therebetween for casting. Next, the composition was subjected to first thermal curing at 60° C. for 60 minutes, followed by photocuring through UV irradiation for 0.5 minutes. Next, the composition was heated again to 80° C., followed by second thermal curing for 2 hours, thereby forming a cured product layer.

Example 2

A cured product layer was formed in the same manner as in Example 1 except that time for photocuring through UV irradiation was increased to 1.0 minute.

Example 3

A cured product layer was formed in the same manner as in Example 1 except that time for photocuring through UV irradiation was increased to 2.0 minutes.

Comparative Example 1

100 parts by weight of a polymerizable compound was prepared by partial polymerization of 95 parts by weight of 2-ethylhexyl acrylate and 5 parts by weight of acrylic acid, followed by mixing with 0.2 parts by weight of ethylhexyl peroxydicarbonate (PX 47, initiation temperature: 47° C.) as a thermal initiator, thereby preparing a curable resin composition. The curable resin composition was injected between glass plates having a gap of 3.5 mm for casting. Next, the composition was subjected to thermal curing at 60° C. for 4 hours, thereby forming a cured product layer.

Comparative Example 2

A cured product layer was formed in the same manner as in Comparative Example 1 except that the composition was subjected to first thermal curing at 60° C. for 1 hour, followed by second thermal curing at 100° C. for 3 hours.

Property Evaluation

FIG. 1 is a graph depicting solid content with respect to curing time, as measured on curable resin compositions prepared in Examples 1 to 3. It could be seen that there is a sharp increase in solid content in portions indicated by respective arrows as the respective stages of curing are performed.

Figure 2:
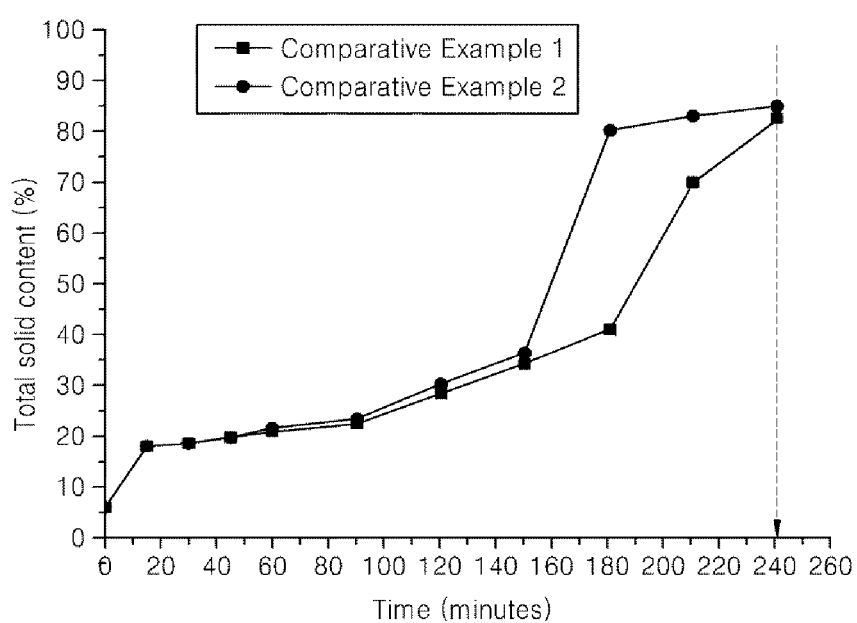
FIG. 2 is a graph depicting solid content with respect to curing time, as measured on curable resin compositions prepared in Comparative Examples 1 to 2.

FIG. 2 is a graph depicting solid content with respect to curing time, as measured on curable resin compositions prepared in Comparative Examples 1 to 2.

In FIG. 1, a conversion rate corresponding to a solid content of 90% by weight (wt %) or more was obtained after about 2 hours (see a dotted line), and in FIG. 2, a conversion rate corresponding to a solid content of 90 wt % or more was obtained after 4 hours (refer to a dotted line). From this result, it could be seen that the compositions of Examples secured a high conversion rate while significantly reducing curing time.

<Molecular Weight Distribution>

Molecular weight distribution was measured on the cured product layer prepared in Example 2 using gel permeation chromatography (GPC), and two peaks were obtained as a result. Molecular weight and polydispersity index (PDI) for each peak are shown in Table 1.

TABLE 1

|  | Number average molecular weight (Mn) | Weight average molecular weight (Mw) | Polydispersity index (PDI = Mw/Mn) |
|---|---|---|---|
| First peak | $1.08 \times 10^5$ | $1.57 \times 10^5$ | 1.45 |
| Second peak | $1.17 \times 10^6$ | $1.40 \times 10^6$ | 1.20 |

It could be seen from Table 1 that, since the cured product layer of Example 2 was prepared through a plurality of independent stages of curing, the cured product layer of Example 2 had two peaks in the molecular weight distribution.

<Glass Transition Temperature>

Glass transition temperature was measured on the cured product layers of Examples 1 to 3 using differential scanning calorimetry (DSC), and three glass transition temperatures were obtained for each of the cured product layers as a result. Results are shown in Table 2.

TABLE 2

|  |  | Measured Tg (° C.) |
|---|---|---|
| Example 1 | First glass transition temperature | 53.3 |
|  | Second glass transition temperature | 79.3 |
|  | Third glass transition temperature | 123.2 |
| Example 2 | First glass transition temperature | 53.1 |
|  | Second glass transition temperature | 77.5 |
|  | Third glass transition temperature | 121.5 |
| Example 3 | First glass transition temperature | 53.0 |
|  | Second glass transition temperature | 75.4 |
|  | Third glass transition temperature | 120.5 |

It could be seen from Table 2 that, since the cured product layers of Examples 1 to 3 were prepared through plural independent curing stages, the cured product layers of Examples 1 to 3 had plural glass transition temperatures.

The invention claimed is:

1. A sheet comprising a cured product layer cured from a curable resin composition, wherein the curable resin composition comprises:
   a curable compound comprising an acrylic compound, wherein the acrylic compound comprises:
   acrylic acid; and
   at least one (meth)acrylic acid ester compound selected from the group consisting of methyl(meth)acrylate, ethyl (meth)acrylate, n-propyl(meth)acrylate, isopropyl(meth)acrylate, n-butyl(meth)acrylate, t-butyl (meth)acrylate, sec-butyl(meth)acrylate, pentyl (meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate and tetradecyl(meth)acrylate;
   a photoinitiator; and
   at least two thermal initiators, wherein the at least two thermal initiators comprises:
   a first thermal initiator, wherein the first thermal initiator is configured to start curing at 40° C. to 60° C.; and
   a second thermal initiator, wherein the second thermal initiator is configured to start curing at 70° C. to 90° C.,
   wherein the cured product layer exhibits a molecular weight distribution having at least two peaks,
   wherein the cured product layer has a first peak at a number average molecular weight of $10^4$ to $10^5$, and a second peak at a number average molecular weight of greater than $10^5$ to $10^6$, and the cured product layer has a first glass transition temperature of 45° C. to 60° C., a second glass transition temperature of 65° C. to 85° C., and a third glass transition temperature of 100° C. to 130° C.,
   wherein the cured product layer is cured from the curable resin composition by sequentially performing a first thermal curing, a photocuring through light irradiation, and a second thermal curing to the curable resin composition, and
   wherein the cured product layer has a thickness of more than 3.0 mm and 10.0 mm or less.

2. The sheet according to claim 1, comprising:
   a base film; and
   the cured product layer formed on one or both surfaces of the base film.

3. The sheet according to claim 1, wherein curable resin composition further comprises:
   at least one additive selected from the group consisting of thermal conductive additives, flame retardants, pigments, antioxidants, UV stabilizers, dispersants, defoamers, thickeners, plasticizers, adhesion-imparting resins, and silane coupling agents.

4. The sheet according to claim 1, wherein, in the curable resin composition, the at least two thermal initiators are present in an amount of 0.1 part by weight to about 1.5 part by weight, based on 100 parts by weight of the curable compound.

5. The sheet according to claim 1, wherein, in the curable resin composition, a weight ratio of each of the at least two initiators to the photoinitiator is in a range from about 0.5 to about 3.

* * * * *